Nov. 11, 1924.                                                    1,514,938
A. TAUB
CONNECTING GEARING
Filed Feb. 7, 1923
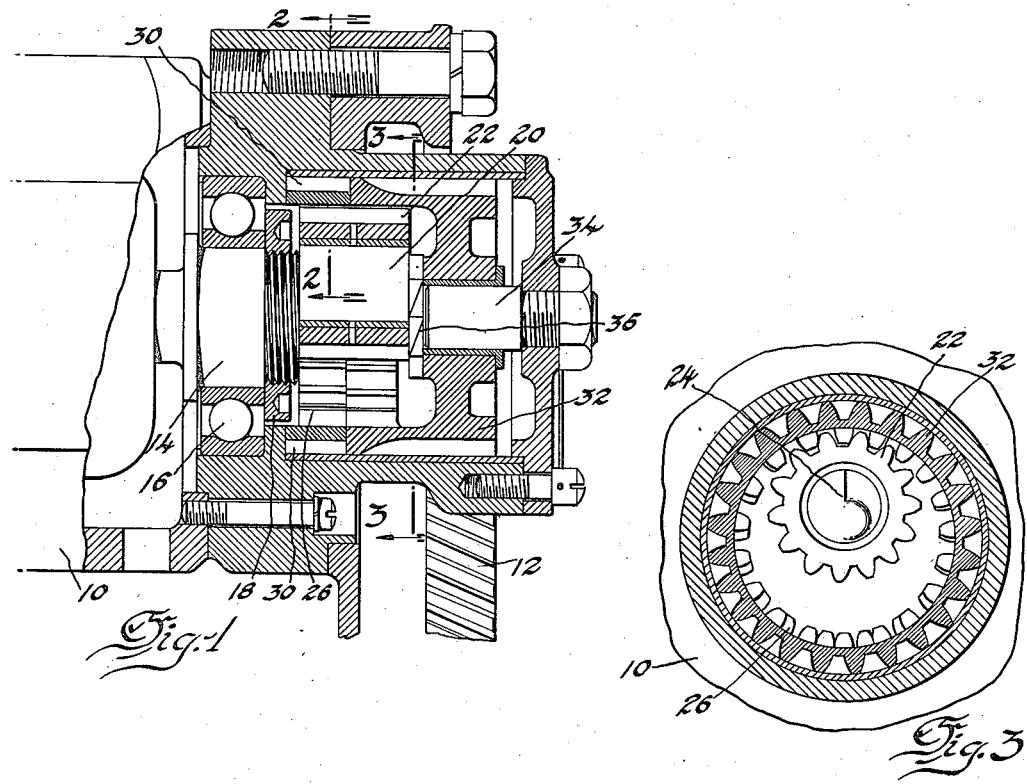
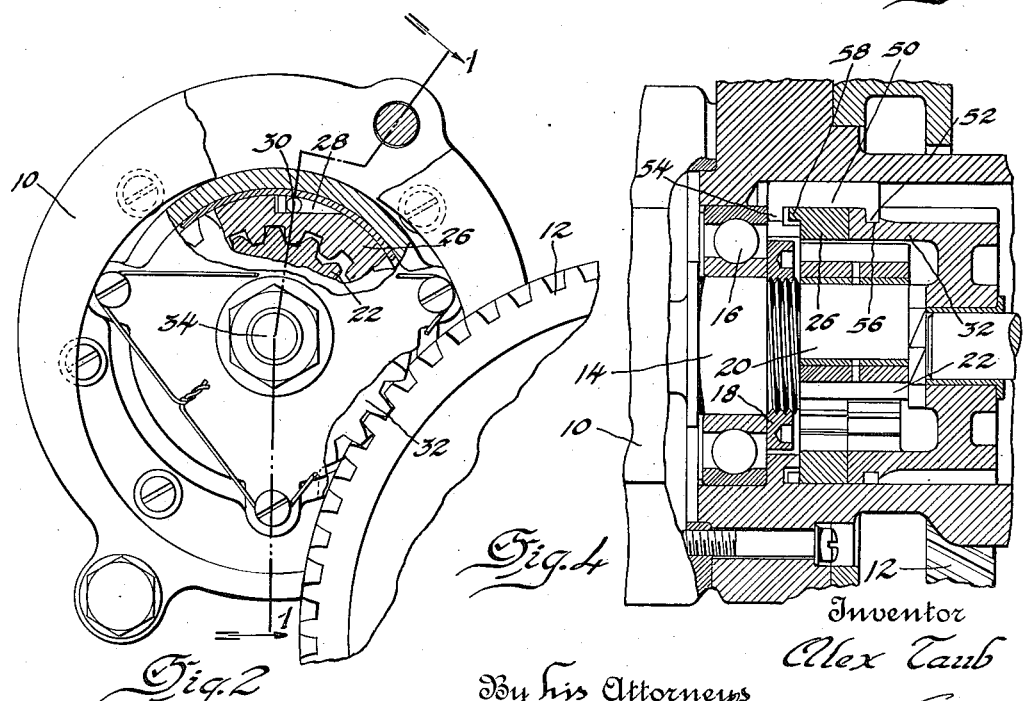
Inventor
Alex Taub
By his Attorneys
Blackmore, Spencer & Flint Patented Nov. 11, 1924.

1,514,938

UNITED STATES PATENT OFFICE.

ALEX TAUB, OF DETROIT, MICHIGAN, ASSIGNOR TO GENERAL MOTORS CORPORATION, OF DETROIT, MICHIGAN, A CORPORATION OF DELAWARE.

CONNECTING GEARING.

Application filed February 7, 1923. Serial No. 617,579.

*To all whom it may concern:*

Be it known that I, ALEX TAUB, a citizen of the United States of America, and a resident of Detroit, county of Wayne, and State of Michigan, have invented certain new and useful Improvements in Connecting Gearing, of which the following is a full, clear, concise, and exact description, such as will enable others skilled in the art to which the invention relates to make and use the same, reference being made therein to the accompanying drawings, which form a part of this specification.

This invention relates to an arrangement of, and connections for, a dynamo-electric machine so that it may operate as a motor, as in starting an internal combustion engine, and may also operate as a generator, as for example to charge the battery when the engine is running. An object of the invention is to provide compact and efficient equipment of this character which will require a minimum of attention from the driver.

Having this object in view, the invention contemplates the use of a movable clutch member which operates automatically when the direction of drive changes, e. g., when the engine starts. Preferably reduction gearing is arranged to be effective when the clutch member is in one position, as when starting, and direct high speed connections are substituted therefor by movement of the clutch member to its opposite (charging) position. In one very effective arrangement, the clutch member is operated by the reversal in direction of axial thrust between intermeshing spiral tooth gears, connected respectively to the engine and to the clutch member, the direction of the axial thrust depending on which gear drives the other and consequently reversing when the engine starts.

The above and other features of the invention, including various novel combinations and desirable particular constructions, will be apparent from the following description of the illustrative embodiments of the invention shown in the accompanying drawings, in which:

Figure 1, is a view, partly in vertical section and partly in side elevation, of a dynamo-electric machine geared as described to an internal combustion engine;

Figure 2 is a view of the same parts, partly in front elevation looking toward the left in Figure 1 and partly in section on the line 2—2 in Figure 1;

Figure 3 is a sectional view on the line 3—3, Figure 1, showing the reduction gearing; and Figure 4 is a view, corresponding to part of Figure 1, of a modification.

In the particular arrangement shown, a dynamo-electric machine 10 is connected by novel connections, described below, to a gear 12, shown as being on the cam shaft of an interval combustion engine, and therefore as as being geared to the engine crankshaft.

The machine 10 has an armature shaft 14, journaled in a ball bearing 16, threaded to receive a collar 18, and reduced at its end to form an eccentric or crank pin 20 on which is mounted a pinion or gear 22. The end of the pin 20 is provided with a tooth 24, to constitute one member of a positive clutch. Meshing with the left-hand end of pinion 22 (Fig. 1) is an internal ring gear 26, provided on its outer periphery with notches 28 to receive rollers 30, constituting a roller clutch of a well known type, which allows the ring gear to turn in a clockwise direction in Figure 2, but locks it to the casing of the machine against turning in the opposite direction.

Surrounding the right hand end of pinion 22 (Fig. 1) is a gear 32, formed with internal teeth meshing with the pinion and with external teeth meshing with the cam-shaft gear 12. Gear 32 is axially slidable on a stub shaft 34 carried by the casing of machine 10, and on its inner face is provided with three teeth 36, any one of which may engage tooth 24, so that the part of the gear on which the teeth are formed constitutes, in effect, an axially movable clutch member operated by the gear. The teeth of gear 12 and the external teeth of gear 32, as clearly shown in Figure 1, are of spiral form, and are inclined in such a direction that when the gear 32 is driving the engine through the cam-shaft gear 12 there is an axial thrust on gear 32 toward the right in Figure 1, while when the engine starts and the cam-shaft gear drives gear 32 the thrust is reversed and is to the left operating to move the gear to close the clutch by engagement of a tooth 36 with tooth 24.

The number of internal teeth on ring gear 26 differs from the number of internal teeth on gear 32; for example, gear 32 may have one less tooth than ring gear 26.

In operation, when the switch connecting machine 10 to the battery is closed, the engine being at rest, the axial thrust of the spiral teeth moves gear 32 to the right, moving the clutch member out of engagement with the end of the armature shaft. Pinion 22 is carried around by pin 20, rolling on gears 26 and 32. As the latter gear has one less tooth than the former, and as it is held by the load of the engine on gear 12, there is a tendency to rotate gear 26 in a counter-clockwise direction (Fig. 2). Such rotation is, however, prevented by rollers 30, which lock gear 26 to the casing of the machine, so that gear 32 is advanced one tooth for each rotation of the armature shaft, thus operating the crank shaft gear 12, powerfully but at a low speed, to start the engine.

When the engine starts, gear 32 is no longer held back by the cam-shaft gear 12, but is instead urged forward, and there is therefore no tendency to turn gear 26 backward; consequently gears 26 and 32, locked together by pinion 22, turn forward as a unit at a speed determined by cam-shaft gear 12, while the reversal of the axial thrust on the spiral teeth moves to the left (Fig. 1) the clutch member formed on gear 32, so that the armature shaft also is driven at this same and relatively high speed. That is to say, the armature shaft, the pinion, and both gears 26 and 32, are all rotated as a unit by gear 12 at a speed determined by and proportional to the engine speed. At this high speed the voltage of the armature current will be higher than the voltage of the battery, and the machine will therefore operate as a generator to charge the battery.

In the modification shown in Figure 4, in lieu of the rollers 30, I provide clutch pins 50, spaced about the casing, each of which is longitudinally slidable in a recess in the casing. Each pin has a semi-cylindrical central portion with a flat face bearing against the exterior of gear 26, and at opposite ends has cylindrical portions 52 and 54. Portion 52 seats in an annular groove 56 in gear 32, so that the pin moves axially with the gear but without turning. Portion 54 constitutes a tooth, arranged to engage one of a set of teeth 58, formed on the edge of ring gear 26. Thus when gear 32 moves to the right, when the engine is being started, it carries with it pins 50, which lock ring gear 26 to the casing to operate the reduction gearing as explained above, while when the engine starts and gear 32 moves to the left, ring gear 26 is released.

While desirable embodiments of my invention have been described above, obviously many modifications are possible, and it is not my intention to limit the scope of the invention to the forms so described, or otherwise than by the terms of the appended claims.

I claim:

1. Connecting gearing comprising, in combination, an eccentric or crank pin, a pinion rotatably mounted thereon, a pair of co-axial internal gears both of which mesh with said pinion, the internal gears differing in number of teeth, an over running roller clutch holding one of said internal gears from turning in one direction and leaving it free to turn in the opposite direction, the other of said internal gears having external spiral teeth to operate as described and being axially movable according to the thrust on the external teeth, and a clutch between said pin and the axially-movable gear operated by axial movement of the gear.

2. Connecting gearing comprising, in combination, an eccentric or crank pin, a pinion rotatably mounted thereon, a pair of co-axial internal gears both of which mesh with said pinion, the internal gears differing in number of teeth, means holding one of said internal gears from turning in one direction and leaving it free to turn in the opposite direction, the other of said internal gears having external spiral teeth to operate as described and being axially movable according to the thrust on the external teeth and a clutch between said pin and the axially-movable gear operated by axial movement of the gear.

In testimony whereof I affix my signature.

ALEX TAUB.